United States Patent [19]

Eddy

[11] 3,806,659

[45] Apr. 23, 1974

[54] INTERLOCK ARRANGEMENT FOR A COMMUNICATION SWITCHING SYSTEM

[75] Inventor: John W. Eddy, Villa Park, Ill.

[73] Assignee: GTE Automatic Electric Laboratories Incorporated, Northlake, Ill.

[22] Filed: Aug. 17, 1972

[21] Appl. No.: 281,586

[52] U.S. Cl. .......... 179/18 GE
[51] Int. Cl. .......... H04q 3/42
[58] Field of Search .......... 179/18 GE

[56] References Cited

UNITED STATES PATENTS 3,681,537 8/1972 Eddy et al. .......... 179/18 GE
3,678,208 7/1972 Eddy .......... 179/18 GE

*Primary Examiner*—Thomas W. Brown
*Attorney, Agent, or Firm*—B. E. Franz

[57] ABSTRACT

A reference potential is applied to a holding control circuit of a path through a communication switching system network to maintain temporarily the establishment of the path between a line and a selected one of a plurality of register junctors when the control of the establishment of the connection through the network is transferred from a marker controlling the network and the register junctor of a register apparatus. After being seized by the marker, the register junctor then applies a second potential to the holding control circuit to maintain the path established. After removing the reference potential from the holding circuit by the marker, it detects the presence of the second potential to verify that the register junctor has taken control of the path through the switching network. Prior to connecting the reference potential to the holding circuit, the marker also detects the supply potential being connected by the switching network to the holding circuit before completing the circuit with the reference potential, the second potential being intermediate the reference potential and the supply potential. The marker also detects the supply potential being connected by the register junctor to the marker via a control path to determine that the marker is connected to the register junctor before seizing it, and after the register junctor supplies the second potential, the marker determines that the register junctor is maintaining the connection of the second potential to the holding circuit.

10 Claims, 13 Drawing Figures

INTERLOCK ARRANGEMENT FOR A COMMUNICATION SWITCHING SYSTEM

BACKGROUND OF THE INVENTION

1. Field of the Invention

This invention relates to an interlock arrangement for a communication switching network, and more particularly it relates to an arrangement for switching the control of an established path between a marker and a register junctor of a communication switching system.

2. Description of the Prior Art

Markers for controlling switching networks of a communication common control system have been employed, and in this regard reference may be made to U.S. Pat. No. 3,293,368. The markers control a switching network for completing a path from an originating station through the network by an originating marker to an intermediate point, usually an originating junctor. Thereafter, a path is established through the originating junctor to a register-sender, which is arranged to accept information from a calling line via a register junctor. At this point, the originating marker then switches control of the path from itself to the register junctor so that after the line information is received, the register junctor can maintain control of the connection. While such a marker-control system is efficient in operation, it would be highly desirable to have a switching interlock arrangement which would insure that the transfer of control from one such subsystem to the other would occur without the possibility of causing the thus far established connections to be lost in the case of malfunctioning equipment or the like. In this regard, it would be highly desirable to insure that the control is transferred to the other subsystem before the first subsystem releases.

SUMMARY OF THE INVENTION

Accordingly, it is an object of this invention to provide a new and improved switching interlock arrangement for a communication switching system, which arrangement efficiently and effectively transfers control of an established path through a switching network between a marker and a selected register junctor in a manner which insures against or greatly minimizes the possibility of inadvertently losing established connections during the transfer of the path control.

According to the invention, a reference potential is connected to a control circuit by the marker to maintain a temporarily-established path between the switching network and a selected one of the register junctors, and a detecting circuit responds to the reference potential for causing the seizure of the preselected register junctor to cause it in turn to supply a second potential to the holding control circuit for holding purposes. The marker detects a signal from the register junctor indicating that it is ready to assume control of the switching network, and the detecting circuit of the marker responds to the second potential for removing the reference potential from the holding circuit of the network. Prior to the connecting of the reference potential by the marker to the holding control circuit, the detection circuit is also adapted to detect the establishment of the holding control circuit by determining that the switching network has connected the supply potential to the holding circuit.

CROSS-REFERENCES TO RELATED APPLICATIONS

The register-sender subsystem with which the interlock arrangement of the present invention cooperates is disclosed in U.S. Pat. application Ser. No. 201,851 filed Nov. 24, 1971, now U.S. Pat. No. 3,737,873, by S. E. Puccini for a "DATA PROCESSOR WITH CYCLIC SEQUENTIAL ACCESS TO MULTIPLEXED LOGIC AND MEMORY," hereinafter referred to as the "REGISTER-SENDER" patent application.

For a description of a similar marker arrangement for a communication switching system, as mentioned previously, reference may be made to the U.S. Pat. 3,293,368 by W. R. Wedmore for a "MARKER FOR A COMMUNICATION SWITCHING NETWORK," hereinafter referred to as the MARKER patent application.

GENERAL DESCRIPTION OF THE INTERLOCK ARRANGEMENT

Figure 1:
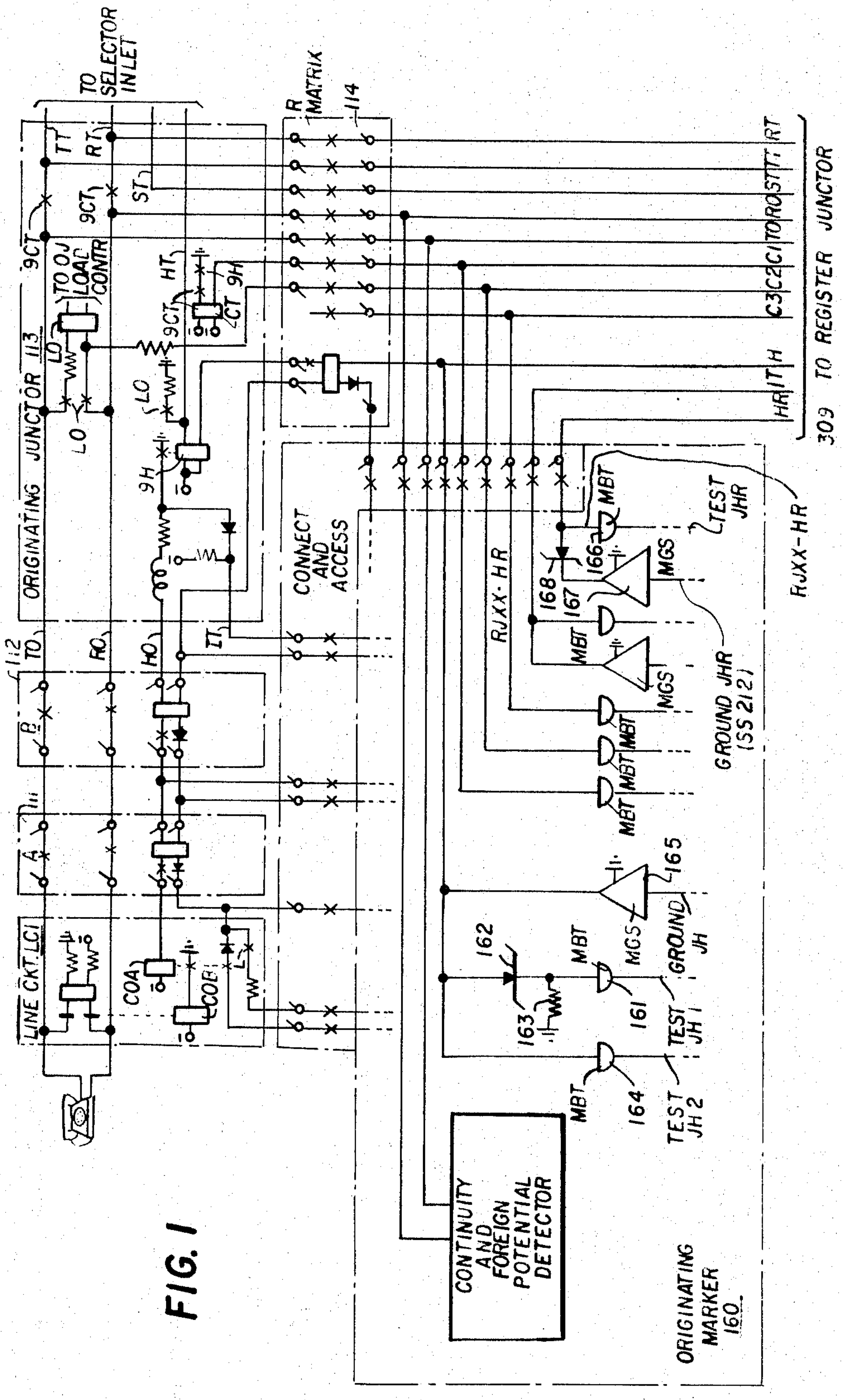
FIG. 1 is a schematic and functional block diagram of a system incorporating an interlock arrangement of the present invention.
Figure 3:
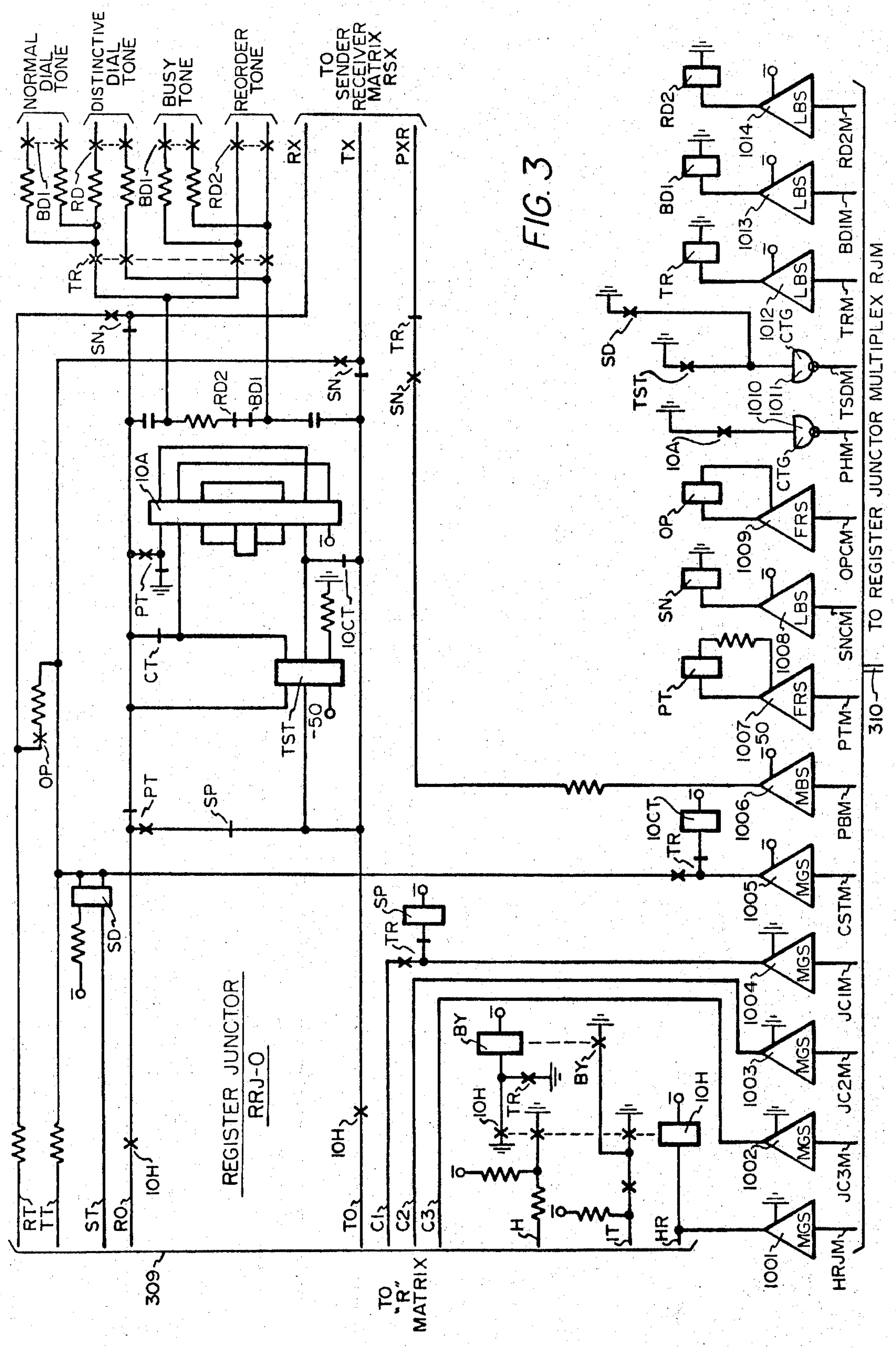
FIG. 3 is a schematic and functional block diagram of a register junctor.
Figure 11:
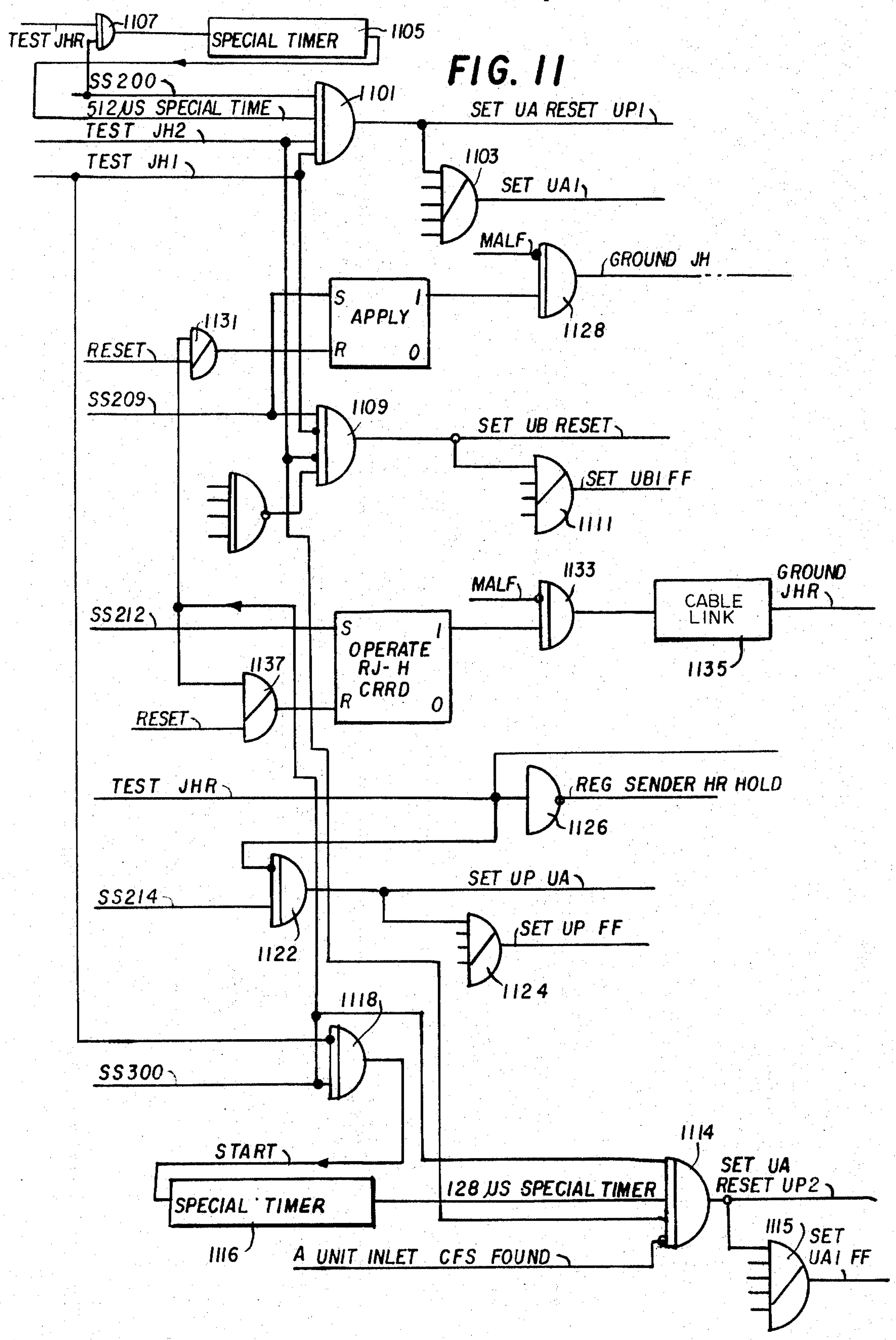
FIG. 11 is a functional block diagram of a portion of the originating marker relating to the interlock arrangement of the present invention.

Referring now to FIGS. 1, 3 and 11, there is shown in accordance with the present invention, an interlock arrangement for a communication switching system, the interlock arrangement enabling the control of an established path to be transferred efficiently and effectively from an originating marker 160 (FIG. 1) to a register junctor (FIG. 3). Such established path refers to an originating path established from a calling line, a line circuit, an A matrix 111, a B matrix 112, an originating junctor 113, and an R matrix 114 to a register junctor shown in FIG. 3 under the control of the originating marker 160 of FIG. 1. After the register junctor is seized, the interlock arrangement of the present invention switches control from the originating marker to the register junctor to permit the originating marker 160 to be released, whereby the marker may be then employed to establish other connections through the switching network. A holding path on the lead H to the register junctor maintains the connection through the switching network comprising the A, B, and R matrices, and ground potential is placed on the lead H by the originating marker 160 to hold the connection. Thereafter, the marker 160 seizes the register junctor via its lead HR to cause the register junctor to apply a resistance ground potential to the lead H. This resistance ground potential is detected thereafter by the originating marker 160, and in response thereto, the originating marker 160 relinquishes its control to complete the interlock as hereinafter described in greater detail.

General System Description

Figure 2:
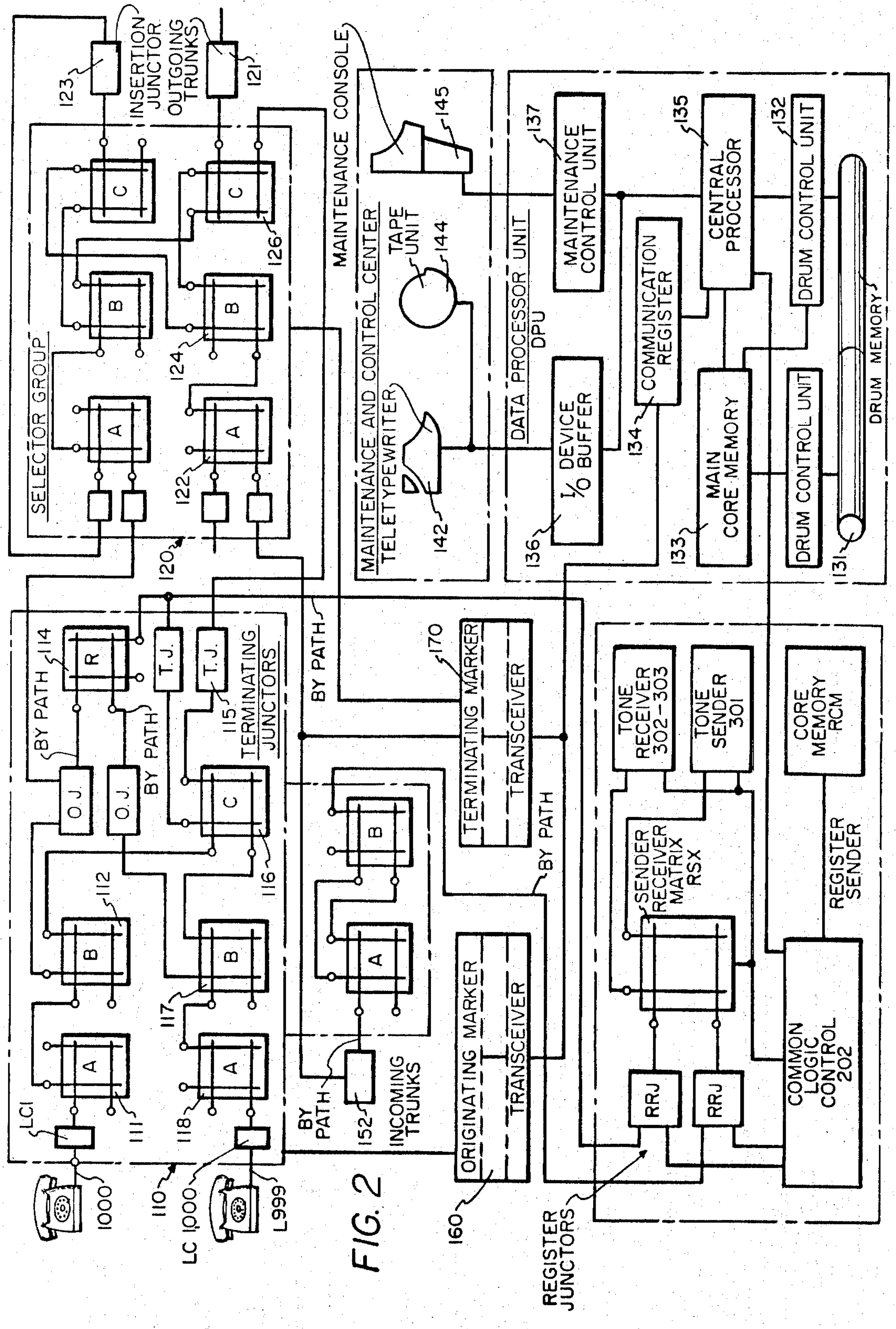
FIG. 2 is a block diagram of the communication switching system incorporating the preferred embodiment of the present invention.

The telephone switching system is shown in FIG. 2. The system is disclosed in said system patent application, and also in said REGISTER-SENDER MEMORY CONTROL patent application. The system comprises a switching portion comprising a plurality of line groups such as line group 110, a plurality of selector groups such as selector group 120, a plurality of trunk-register groups such as group 150, a plurality of originating markers, such as marker 160, and a plurality of terminating markers such as marker 170; and a control portion which includes register-sender groups such as RS, data processing unit DPU, and a maintenance control center 140. The line group 110 includes reed-relay switching network stages A, B, C and R for providing local lines L000–L999 with a means of accessing the system for originating calls and for providing a means of terminating calls destined for local customers. The trunk-register group 150 also includes reed-relay switching networks A and B to provide access for incoming trunks 152 to connect them to the register-sender, the trunks also being connected to selector inlets. The selector group 120 forms an intermediate switch and may be considered the call distribution center of the system, which routes calls appearing on its inlets from line groups or from incoming trunks to appropriate destinations, such as local lines or outgoing trunks to other offices, by way of reed-relay switching stages A, B and C. Thus the line group 110, the trunk-register group 150, and the selector group 120 form the switching network for this system and provide fullmetallic paths through the office for signaling and transmission.

The originating marker 160 provides high-speed control of the switching network to connect calls entering the system to the register-sender 200. The terminating markers 160 control the switching networks of the selector group 120 for establishing connections therethrough; and if a call is to be terminated at a local customer's line in the office then the terminating marker sets up a connection through both the selector group 120 and the line group 120 to the local line.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the register-sender. A group of register junctors RRJ function as peripheral units as an interface between the switching network and the common logic circuits of the register-sender. The referrite core memory RCM stores the digital information under the control of a common logic 202. Incoming digits may be supplied from the register junctors via a register receiver matrix RSX and tone receivers 302–303 to a common logic, or may be received in dial pulse mode directly from the register junctors. Digits may be outpulsed by dial pulse generators directly from a register junctor or multifrequency senders 301 which are selectively connected to the register junctors via the sender-receiver matrix RSX. The common logic control 202, and the core memory RCM form the register apparatus of the system, and provide a pool of registers for storing call processing information received via the register-junctors RRJ. The information is stored in the core memory RCM on a time-devision multiplex sequential access basis, and the memory RCM can be accessed by other subsystems such as the data processor unit 130 on a random access basis.

The data processor unit DPU provides stored program computer control for processing calls through the system. Instructions provided by the unit DPU are utilized by the register RS and other subsystems for processing and routing of the call. The unit DPU includes a drum memory 131 for storing, among other information, the equipment number information for translation purposes. A pair of drum control units, such as the unit 132 cooperate with a main core memory 133 and control the drum 131. A central processor 135 accesses the register-sender RS and communicates with the main core memory 133 to provide the computer control or processing calls through the system. A communication register 134 transfers information between the central processor and the originating markers 160 and terminating markers 170. An input/output device buffer 136 and a maintenance control unit 137 transfer information from the maintenance control center 140.

The line group 110 in addition to the switching stages includes originating junctors 113 and terminating junctors 115. On an originating call the line group provides concentration from the line terminals to the originating junctor. Each originating junctor provides the split between calling and called parties while the call is being established, thereby providing a separate path for signaling. On a terminating call, the line group 110 provides expansion from the terminating junctors to the called line. The terminating junctors provide ringing control, battery feed, and line supervision for calling and called lines. An originating junctor is used for every call originating from a local line and remains in the connection or the duration of the call. The originating junctor extends the calling line signaling path to the register junctor RRJ of the register-sender RS, and at the same time provides a separate signaling path from the register-sender to the selector group 120 for outpulsing, when required. The originating junctor isolates the calling line until cut-through is effected, at which time the calling party is switched through to the selector group inlet. The originating junctor also provides line lock out. The terminating junctor is used for every call terminating on a local line and remains in the connection for the duration of the call.

The selector group 120 is the equipment group which provides intermediate mixing and distribution of the traffic from various incoming trunks and junctors on its inlets to various outgoing trunks and junctors on its outlets.

The markers used in the system are electronic units which control the selection of idle paths in the establishing of connections through the matrices, as explained more fully in said MARKER patent application. The originating marker 160 detects calls for service in the line and/or trunk register group 150, and controls the selection of idle paths and the establishment of connections through these groups. On line originated calls, the originating marker detects calls for service in the line matrix, controls path selection between the line and originating junctors and between originating junctors and register junctors. On incoming trunk calls the originating marker 160 detects calls for service in the incoming trunks connected to the trunk register group 150 and controls path selection between the incoming trunks 152 and register junctors RRJ.

The terminating marker 170 controls the selection of idle path in the establishing of connections for terminating calls. The terminating marker 170 closes a matrix access circuit which connects the terminating marker to the selector group 120 containing a call-for-service, and if the call is terminated in a local line, the terminating marker 170 closes another access circuit which in turn connects the marker to the line group 120. The marker connects an inlet of the selector group to an idle junctor or trunk circuit. If the call is to an idle line the terminating marker selects an idle terminating junctor and connects it to a line group inlet, as well as connecting it to a selector group inlet. For this purpose the appropriate idle junctor is selected and a path through the line group 110 and the selector group 120 is established.

The data processor unit 130 is the central coordinating unit and communication hub for the system. It is in essence a general purpose computer with special input-output and maintenance features which enable it to process data. The data processing unit includes control of: the originating process communication (receipt of line identity, etc.), the translation operation, route selection, and the terminating process communication. The translation operation includes: class-of-service look-up, inlet-to-directory number translation, matrix outlet-to-matrix inlet translation, code translation and certain special feature translations.

Typical Calls

This part presents a simplified explanation of how a call is processed by the system. The call type covered is a call from a local party served by one switching unit to another local party served by the same switching unit.

In the following presentations, reed relays are referred to as correeds. Not all of the data processing operations which take place are included.

Local Line-to-Local Line Call

When a customer goes off-hook, the D.C. line loop is closed, causing the line correed of his line circuit to be operated. This action constitutes seizure of the central office switching equipment, and places a call-for-service.

After an originating marker has identified the calling line equipment number, has preselected an idle path, and has identified the R unit outlet, this information is loaded into the marker communication register and sent to the data processor unit via its communication transceiver.

While sending line number identity (LNI) and route data to the data processor, the marker operates and tests the path from the calling line to the register junctor. The closed loop from the calling station operates the register junctor pulsing relay, contacts of this relay are coupled to a multiplex pulse reception highway.

The data processor unit, upon being informed of a call origination, enters the originating phase.

As previously stated, the "data frame" (block of information) sent by the marker includes the equipment identity of the originator, originating junctor and register junctor, plus control and status information. The control and status information is used by the data processor control program in selecting the proper function to be performed on the data frame.

The data processor analyzes the data frame sent to it, and from it determines the register junctor identity. A register junctor translation is required because there is no direct relationship between the register junctor identity as found by the marker and the actual register junctor identity. The register junctor number specifies a unique cell of storage in the core memories of both the register-sender and the data processor, and is used to identify the call as it is processed by the remaining call processing programs.

Once the register junctor identity is known, the data frame is stored in the data processor's call history table (addressed by register junctor number), and the register-sender is notified that an origination has been processed to the specified register junctor.

Upon detecting the pulsing highway and a notification from the data processor that an origination has been processed to the specified register junctor, the central control circuits of the register-sender sets up a hold ground in the register junctor. The marker, after observing the register junctor hold ground and that the network is holding, disconnects from the matrix. The entire marker operation takes approximately 75 milliseconds.

Following the register junction translation, the data processor performs a class-of-service translation. Included in the class-of-service is information concerning party test, coin test, type of ready-to-receive signaling such as dial tone required, type of receiver (if any) required, billing and routing, customer special features, and control information used by the digit analysis and terminating phase of the call processing function. The control information indicates total number of digits to be received before requesting the first dialed pattern translation, pattern recognition field of special prefix or access codes, etc.

The class-of-service translation is initiated by the same marker-to-data processor data frame that initiated the register junctor translation, and consists of retrieving from drum memory the originating class-of-service data by an associative search, keyed on the originator's LNI (line number identity). Part of the class-of-service information is stored in the call history table (in the data processor unit core memory), and part of it is transferred to the register-sender core memory where it is used to control the register junctor.

Before the transfer of data to the register-sender memory takes place, the class-of-service information is first analyzed to see if special action is required (e.g., non-dial lines or blocked originations). The register junctor is informed of any special services the call it is handling must have. This is accomplished by the data processor loading the results of the class-of-service translation into the register-sender memory words associated with the register junctor.

After a tone receiver connection (if required), the register junctor returns dial tone and the customer proceeds to key (touch calling telephone sets) or dial the directory number of the desired party. (Party test on ANI lines is performed at this time.)

The register junctor pulse repeating correed follows the incoming pulses (dial pulse call assumed), and repeats them to the register-sender central control circuit (via a lead multiplex). The accumulated digits are stored in the register-sender core memory.

In this example, a local line without special features is assumed. The register-sender requests a translation after collecting the first three digits. At this point, the data processor enters the second major phase of the call processing function - the digit analysis phase.

The digit analysis phase includes all functions that are performed on incoming digits in order to provide a route for the terminating process phase of the call processing function. The major inputs for this phase are the dialed digitals received by the register-sender and the originator's class-of-service which was retrieved and stored in the call history table by the originating process phase. The originating class-of-service and the routing plan that is in effect is used to access the correct data tables and provide the proper interpretation of the dialed digits and the proper route for local terminating (this example) or outgoing calls.

Since a local-to-local call is being described (assumed), the data processor will instruct the register-sender to accumulate a total of seven digits and request a second translation. The register-sender continues collecting and storing the incoming digits until a total of seven digits have been stored. At this point, the register-sender requests a second translation from the data processor.

For this call, the second translation is the final translation, the result of which will be the necessary instructions to switch the call through to its destination. This information is assembled in the dedicated call history table in the data processor core memory. Control is transferred to the terminating process phase.

The terminating process phase is the third (and final) major phase of the call processing function. Sufficient information is gathered to instruct the terminating marker to establish a path from the selector matrix inlet to either a terminating local line (this example) or a trunk group. This information plus control information (e.g. ringing code) is sent to the terminating marker.

On receipt of a response from the terminating marker, indicating its attempt to establish the connection was successful, the data processor instructs the register-sender to cut through the originating junctor and disconnect on local calls (or begin sending on trunk calls). The disconnect of the register-sender completes the data processor call processing function. The following paragraphs describe the three-way interworking of the data processor, terminatng marker, and the register-sender as the data frame is sent to the terminating marker, the call is forwarded to the called party and terminated.

A check is made of the idle state of the data processor communication register, and a terminating marker. If both are idle, the data processor writes into register-sender core memory that, this register junctor is working with a terminating marker. All routing information is then loaded into the communication register and sent to the terminating marker in a serial communication.

The register-sender now monitors the ST lead (not shown) to the network, awaiting a ground to be provided by the terminating marker.

The marker checks the called line to see if it is idle. If it is idle, the marker continues its operation. These operations include the pulling and holding of a connection from the originating junctor to the called line via the selector matrix, a terminating junctor, and the line matrix.

Upon receipt of the ground signal on the ST lead from the terminating marker, the register-sender returns a ground on the ST lead to hold the terminating path to the terminating junctor. The marker detects this signal as evidence of proper transfer of control to the Register-Sender.

When the operation of the matrices has been verified by the marker, it releases then informs the data processor of the identity of the path and that the connection has been established. The data processor recognizes from the terminating class that no further extension of this call is required. It then addresses the register-sender core memory with instructions to switch the originating path through the originating junctor.

The register junctor signals the originating junctor to switch through and disconnects from the path, releasing the R matrix. The originating junctor remains held by the terminating junctor via the selector matrix. The register-sender clears its associated memory slot and releases itself from the call. The dedicated call history table (for that register) in the data processor core memory is returned to idle.

Symbolism for Gates and Bistable Devices

The common logic circuits of the register-sender subsystem are generally implemented with integrated circuits, mostly in the form of NAND gates, although some other forms are also used. The showing of the logic in the drawings is simplified by using gate symbols for AND and OR functions, the AND function being indicated by a line across the gate parallel to the input base line, and the OR function being indicated by diagonal line across the gate. Inversion is indicated by a small circle on either an input or an output lead. The gates are shown as having any number of inputs and outputs, but in actual implementation these would be limited by loading requirements well known in the art. Latches are indicated in the drawing by square functional blocks with inputs designated S and R for set and reset respectively; the circuits being in practice implemented generally by two NAND gates with the output of each connected to an input of the other, which makes the circuit a bistable device. The logic also uses bistable devices in the form of JK flip-flops implemented with integrated circuits, indicated in the drawings by rectangles having the J and K inputs indicated by small semicircles, a clock input indicated by C, and set and reset inputs indicated by S and R. Not all of the inputs for these devices are shown in the drawings. The J and K inputs are each actually AND gates having three external inputs, but the unused inputs which are actually terminated in some manner are not shown on the drawings.

Relay units such as the register junctors include interface circuits for signals to and from the electronic frames. These interface circuits are relay drivers and test gates as shown for example at the bottom of FIG. 3. These circuits use discrete transistors rather than integrated circuits. Relay drivers shown as triangles function as switches to operate the relays. Those designated MGS are main ground switches comprising two transistors connected so that when a true signal is applied at the input, ground potential from the main battery is connected via the emitter-collector path of the output stage in saturation to a relay; those designated MBS are main battery switches connected so that with a true signal at the input the negative terminal of the main battery is connected via the emitter-collector path of the output stage in saturation to a relay; those designated FRS are fast-release relay switches comprising two transistors such that when a true signal is applied to the input the two output leads from the collectors of two transistors connected to the two sides of the relay winding supply a low impedance path to operate the relay;

and those designated LBS for low current battery switch comprise a single transistor which when a true signal is applied at the input supply a low impedance path including the collector-emitter path to operate the relay. The contact test gate designated by CTG is a circuit which when ground is supplied via relay contacts at its input supplies a true signal at its output.

Register Junctor and Originating Path

A diagram of a register junctor RRJ-0 is shown in FIG. 3, and an originating path is shown by the diagram of FIG. 1.

FIG. 1 shows the path for a connection in a line group between a calling line to a register junctor and to a selector inlet. The path includes one line circuit LC1, one A stage crosspoint 111, one B stage crosspoint 112, an originating junctor 113, and one R matrix crosspoint 114. The originating junctor includes a hold relay 9H, a cut-through relay 9CT, and a lockout relay L0. FIG. 1 also shows a portion of originating marker 160, particularly some circuits interfacing with the register junctor.

The register junctor's function is the interface between the subscriber lines and incoming trunks, and the time-shared circuits of the register-sender. The register junctors are used for digit receiving or sending, tone application, a battery feed device to the calling station, party and coin testing, busy and idle indication to the originating marker, and as a source of holding potential for the matrix paths while final conversation paths are being established.

There are two types of register junctors; the local register junctors used with the R stage outlet to subscriber lines and coin telephones, and incoming register junctors used with incoming trunks and having less complexities than the local register junctor.

Figure 10:
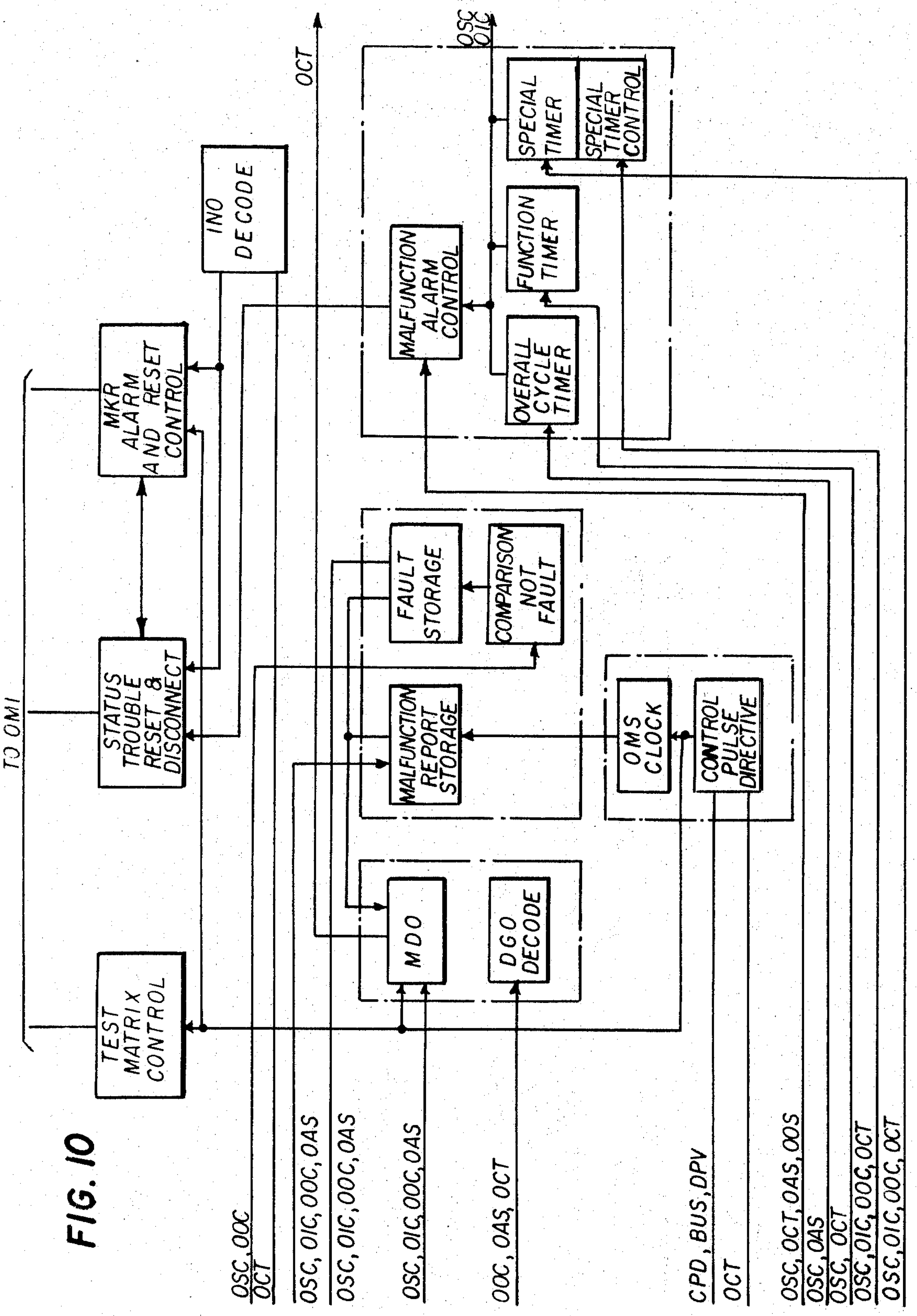

The register junctor RRJ-0 shown in FIG. 10 is a local register junctor.

Relay 10H is a reed relay (correed). It is energized by the originating marker applying ground potential to the HR lead. Contacts of this relay connect the tip and ring leads T0 and R0 to relay 10A, close a path to operate relay BY, which in turn has contacts to apply ground to the IT lead and via a path not shown lights a busy lamp. Contacts of relay 10H also supply resistance ground potential to lead H to hold the originating connection. Relay 10H releases after the register-sender receives specific instructions from the data processing unit that the terminating marker has completed its functions which will cause the register junctor to eventually be released.

Relay BY is an HQA relay. This relay is normally operated by ground potential via contacts of the H relay, but can also be operated by a busy switch not shown. When this happens it makes the register junctor busy to the originating marker. Contacts of relay TR will also hold relay BY operated. Relay TR is operated during sequence states $PSS$=6 to $PSS$=15 which will be described in the operation of the common logic circuits. Since the relay 10H drops after sequence state $PSS$=12, relay TR will hold up the relay BY until memory is cleared. Relay BY is slow to release (25 milliseconds) because of a diode not shown across its coil. This makes it the last relay in the register junctor to release.

Figure 5:
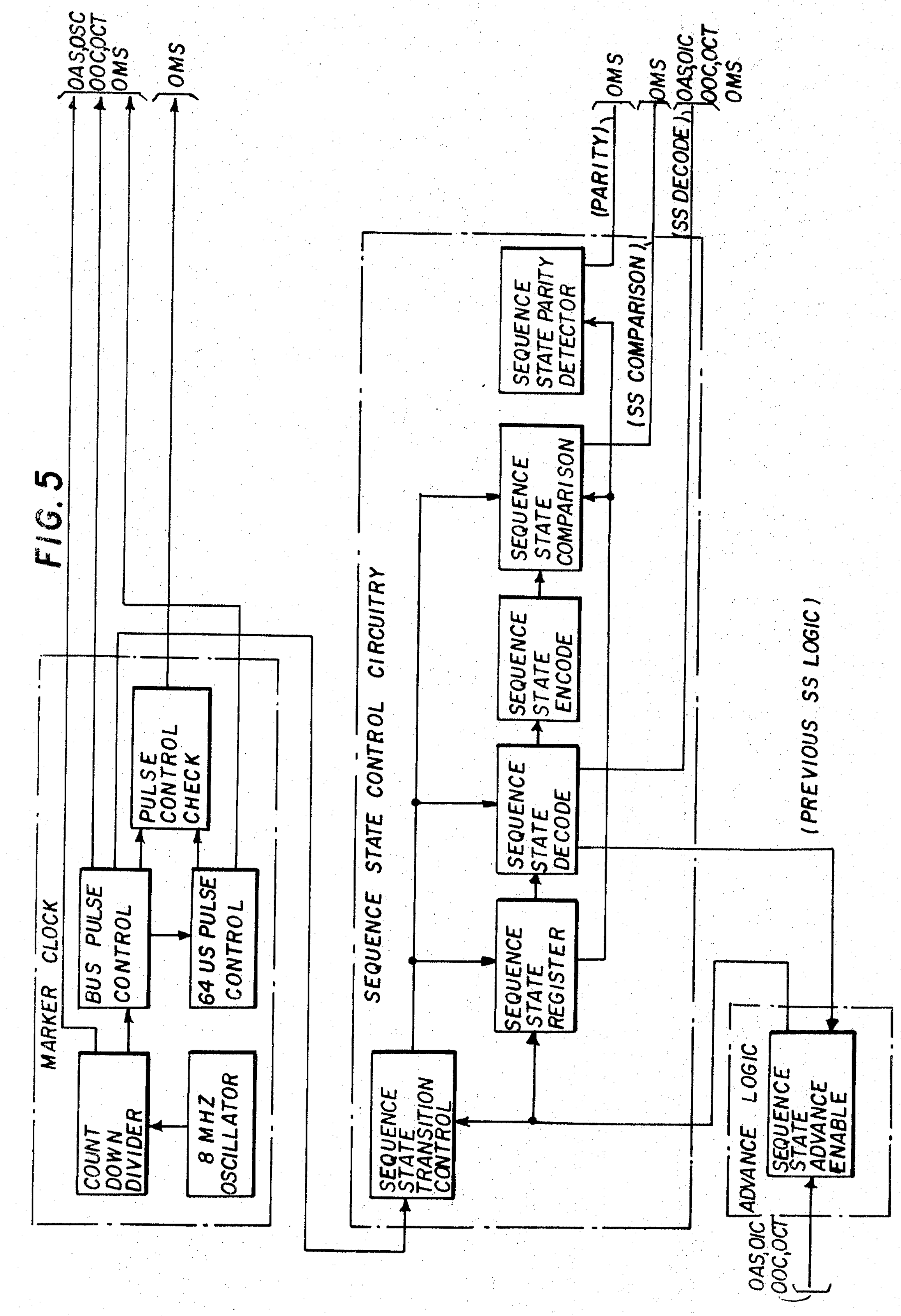

Relay 10A is a single reed relay with three windings, as disclosed in said BATTERY FEED RELAY patent. Two of the windings are connected magnetically in series aiding direction while the third is not actively used. Relay 10A is operated under the control of the subscriber loop (or trunk) via the tip and ring leads. After relay 10H has operated connecting the register junctor to the subscriber line, with the telephone at the subscriber station off-hook closing the path between the T and R leads, relay 10A operates. Contacts of this relay supply ground to a contact test gate 1010, which generates a true signal on lead PHM (pulsing highway) which via the multiplex circuits is supplied to the register controller RRC (FIG. 5). During the reception of dialed digits relay 10A follows the dial pulses which are therefore repeated via lead PHM to the common logic circuits. Relay A is also used in conjunction with relay TST during a party or coin test, and operates if there is a ground on the tip lead at the subscriber station. When relay 10H releases during sequence state $PSS$=13, relay 10A is also released.

Relay BD1 is an HQA relay. It may be operated under two sets of circumstances. The first is to return dial tone to the subscriber during sequence state $PSS$=2 or $PSS$=3, and the second is to return busy tone to a subscriber line or trunk during sequence state $PSS$=11, at which time relay TR is operated. This relay is operated via a signal from the multiplex circuits on lead BD1M which operates the relay driver 1013.

Relay RD2 is an HQA relay. It is operated via a signal on lead RD2M operating relay driver 1014 under two sets of circumstances, one being to return distinctive dial tone to a subscriber, and the second being to return reorder tone if relay TR is also operated.

Relay 10CT is a reed relay. This relay is controlled by the TSC (test sequence counter) in memory. It is operated for 10 milliseconds while performing a coin test or party test. While it is operated it includes the TST relay in the test path from the relay 10A and source battery, to the ground provided for the subscriber equipment.

Relay PT shown in FIG. 10 as a single relay actually comprises two mercury wetted reed relays in parallel, operated by the same fast release relay switch 1007 under control of a signal on lead PTM. They are operated for 30 milliseconds for control of the path for coin and party tests.

Relay SP is a reed relay which is used to open a parallel path during coin testing that is possible when testing for coin deposit from a single slot touch calling telephone. Without the path being open a "series" relay (or equivalent) in some (new single slot) coin telephones may not release, thus preventing coin ground from being applied to the tip side of the line. It is operated as a function of the CB bit of memory and TSC having started. It is operated for the same 30 milliseconds as PT during coin test.

Relay TST is a mercury wetted reed relay with three windings. This relay is used for coin deposited test and party two identification. When the test is not being made two of the windings are shorted out by contacts of relay 10CT. The third winding is constantly active giving a reverse-bias in the relay so that any contact switch bounce or stray potential will not operate relay TST giving a false indication.

Relay TR is a HQA relay which is activated during sequence states $PSS$=6 or greater via relay driver 1012. When operated this relay disables the path for dial tone and enables the busy and reorder tone paths, removes relay CT from the circuit and prepares a path for relay SD, removes relay SP from the circuit and prepares a path for lead C1 to the originating trunk circuit, maintains relay BY operated and opens a path from the sender-receiver pull battery switch 1006 via lead PXR to the matrix. This last set of contacts is a protection feature to insure that a multiple path is not pulled in the matrix should the main battery switch 1006 fail.

Relay SD is a mercury wetted reed relay. This relay (start dial) has two functions in the call process. First it recognizes that the terminating marker has seized the outgoing trunk or terminating junctor and it also receives start dialing commands from the distant office. When the terminating marker seizes and "S" relay of the trunk or terminating junctor, relay SD is also operated. Contacts of this relay operate a test gate 1011 to send a logic signal to the register-sender central control via lead TSDM. In response thereto a signal on lead CSTM operates relay driver 1005 to operate relay SD. When the terminating marker releases, relay SD releases due to the differential, opposing windings, but the S relay of the terminating junctor or trunk is held by the ground from relay driver 1005. When a distant office signals with a start dial (or stop dial if sending is in progress) a ground is received on lead ST causing relay SD to operate. When the distant office causes the start/stop dial to cease, relay SD releases to supply a signal to the register-sender common logic.

Relay OP is a mercury wetted reed relay which has three functions. First it is operated while making a sender or receiver connection. When contacts of relay OP close an A relay in the sender or receiver operates to check continuity of the tip and ring paths. Second, the relay operates during operation of a terminating marker connecting to an outgoing trunk so that the terminating marker can make a continuity check. And lastly this relay is operated and released to send dial pulsing signals. Energizing and releasing the relay causes a path via the tip and ring to alternately short and open.

Relay SN is an HQA relay which has two functions. First it is operated during the connection of a sender or receiver. One set of contacts close to connect the pull relay driver main battery switch 1006 to lead PXR to the matrix during connection. The other purpose is to connect an MF sender to the terminating tip and ring conductors and isolate the originating and terminating tip and ring paths within the register junctor.

An incoming register junctor is similar to the local register junctor described above except that relays TST, 10CT, PT, RD2, and SP are omitted.

Originating Marker

The originating marker 160 of FIGS. 1 and 2 detects calls for service in the line and/or trunk-register groups, and controls the selection of idle paths and the establishment of connections through these groups. The system of FIG. 2 is provided with a pair of originating markers, only one of which is shown. On line-originated calls, the originating marker 160 detects calls for service in the line matrix and controls path selection between the line inlet and register junctors in the register-sender. On incoming trunk calls, the originating marker detects calls for service in the trunk-register matrix and controls path selection between the incoming trunk circuits and register junctors in the register-sender. For a more detailed description of a similar marker, reference may be made to the MARKER patent. An originating marker can serve up to 10 line groups (10,000 lines) and up to 5 trunk-register groups (1,000 incoming trunk circuits). Since the originating markers are provided in pairs (OMA and OMB), both markers simultaneously process traffic; however, they operate asynchronously. In case of a serious marker fault, the other marker of the pair can handle the entire traffic load. When traffic warrants it, two pairs of originating markers (two markers per pair) may be provided for line and trunk traffic. The originating marker handling incoming trunk traffic can serve up to 10 trunk-register groups (2,000 incoming trunks). Only the originating phase of the call is processed by the originating marker; i.e., from the time a call-for-service is detected in a line or trunk-register matrix until a connection to an idle register junctor in the register-sender is established. The primary functions performed by the originating marker during normal call processing are:

a. scan for and detect a call-for-service from a local line or incoming trunk circuit;
b. identify the line group or trunk-register group matrix with a call-for-service and connect to it;
c. identify a matrix inlet with a call-for-service in the matrix calling for service;
d. select an idle path from the matrix inlet calling for service to an idle register junctor;
e. communicate the line number identification (LNI) or trunk number identification (TNI) selected, outlet path identity, and certain control data to the data processor unit; and
f. establish a connection from the selected matrix inlet with a call-for-service to the selected idle register junctor.

The marker also may be required to set up test calls on demand of the data processor unit. In this case, the data processor instructs the marker as to the path to be set up and the manner in which the call is to be processed.

Originating Marker Interface with Other Subsystems

Figure 4:
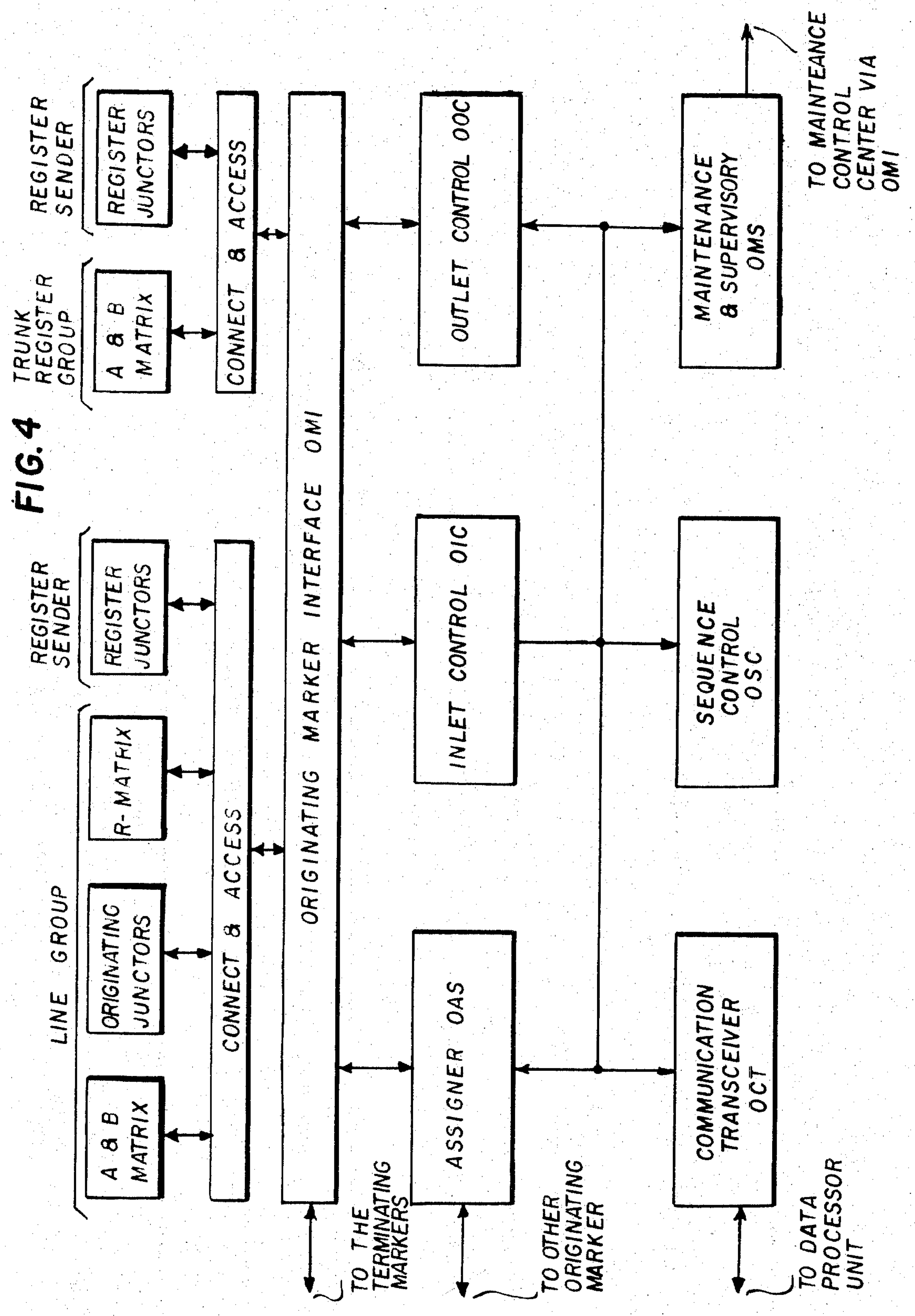
FIGS. 4–10 are block diagrams and layout diagrams of the originating marker of the system of FIG. 2.

As shown in FIG. 4, the originating marker interfaces with all other subsystems except the selector group. Originating marker interface with the line groups and trunk-register groups provides for supervision and control of these switching network matrices. The marker interfaces with its companion (redundant) marker, providing clocked interlock control to prevent a simultaneous connection of the markers to a line matrix or trunk matrix. The originating marker interfaces with the terminating marker (TM), providing reserve bus checks to guard against originating marker/terminating marker double connections to a line or trunk matrix. The originating marker also makes a busy bus check to guard against connecting to a matrix assigned to some other originating marker. Communication links between the originating marker and data processor unit provide for communication between these subsystems. Register-sender interface provides for connecting a matrix inlet to an idle register junctor, and provides for transfer of matrix hold control to the register-sender. Interface with the maintenance and control center provides for supervision of originating marker operation and control of marker reconfiguration.

Originating Marker Organization

The originating marker is divided functionally into seven main circuit groupings (mnemonic-designated circuit groups). 9Six of these mnemonic circuit groups consist of electronic logic. The seventh mnemonic circuit group is comprised of interface circuitry. In addition to these mnemonic circuit groups, the originating marker has a test matrix. The mnemonic circuit groups (shown in FIG. 4) comprising the originating marker are as follows:

a. marker interface (OMI),
b. sequence control (OSC),
c. assigner (OAS),
d. inlet control (OIC),
e. outlet control (OOC),
f. communication transceiver (OCT),
g. maintenance and supervisory (OMS), and
h. test matrix (OTX - not shown).

The 3-letter mnemonic code for each circuit identifies the subsystem of which the circuit is a part (O for originating marker) and the circuit function; e.g., OAS, originating marker assigner; OSC, originating marker sequence control, and so forth. In the paragraphs that follow, each of the mnemonic circuit groups are described in terms of their functions.

Sequence Control Circuit (OSC)

The marker's tasks are highly repetitive in nature and consistent in operating sequences, lending them to a fixed, wired-program controlling the marker's operations. The sequence control circuit combines information retrieved from other mnemonic circuits of the marker to form a decision regarding the next operation in the sequence. By virtue of advancing through a complete sequence, it directs operations throughout the marker.

A block diagram of the sequence control circuit is shown in FIG. 5. Functionally, this circuit consists of the marker clock, advance logic, and sequence state control circuitry. The advance logic determines what sequence state the sequence register should be advanced to by ANDing and ORing the logic commands from other mnemonic circuits of the originating marker, plus the previous sequence state logic.

The marker clock produces the timing pulses necessary to carry out the marker logic functions in an orderly manner, and to synchronize operations. An 8-MHZ oscillator produces 500 KHz pulses which are counted down to produce several slower clock-trains. Previous sequence state logic, plus pulses developed by the marker clock via other mnemonic circuits in the originating marker are used to control sequence state advance.

The sequence state control stores the units (last two digits of sequence state) and tens (first digit of sequence state) logic received from the advance logic and checks for parity. The 10s and units are checked for parity before initializing the pulse used for sequence state advance. The sequence state control decode logic decodes the units and 10s count stored by the sequence register, then ANDS the two for a particular sequence state. The decoded sequence state count is re-encoded for comparison to check the integrity of the decoded count.

Assigner (OAS)

The originating marker assigner monitors both the trunk and line matrix for calls-for-service. It detects their presence, and identifies and connects to the matrix requesting service. In this way, the marker "assigns" itself to the line or trunk matrix with the call-for-service. The assigner busies the assigned matrix to other markers, encodes the matrix identity and loads it into the communication transceiver's shift register for eventual transmittal to the data processor unit. The assigner's interlock and clock control prevents the other marker of the pair from accessing the same matrix simultaneously.

Figure 6:
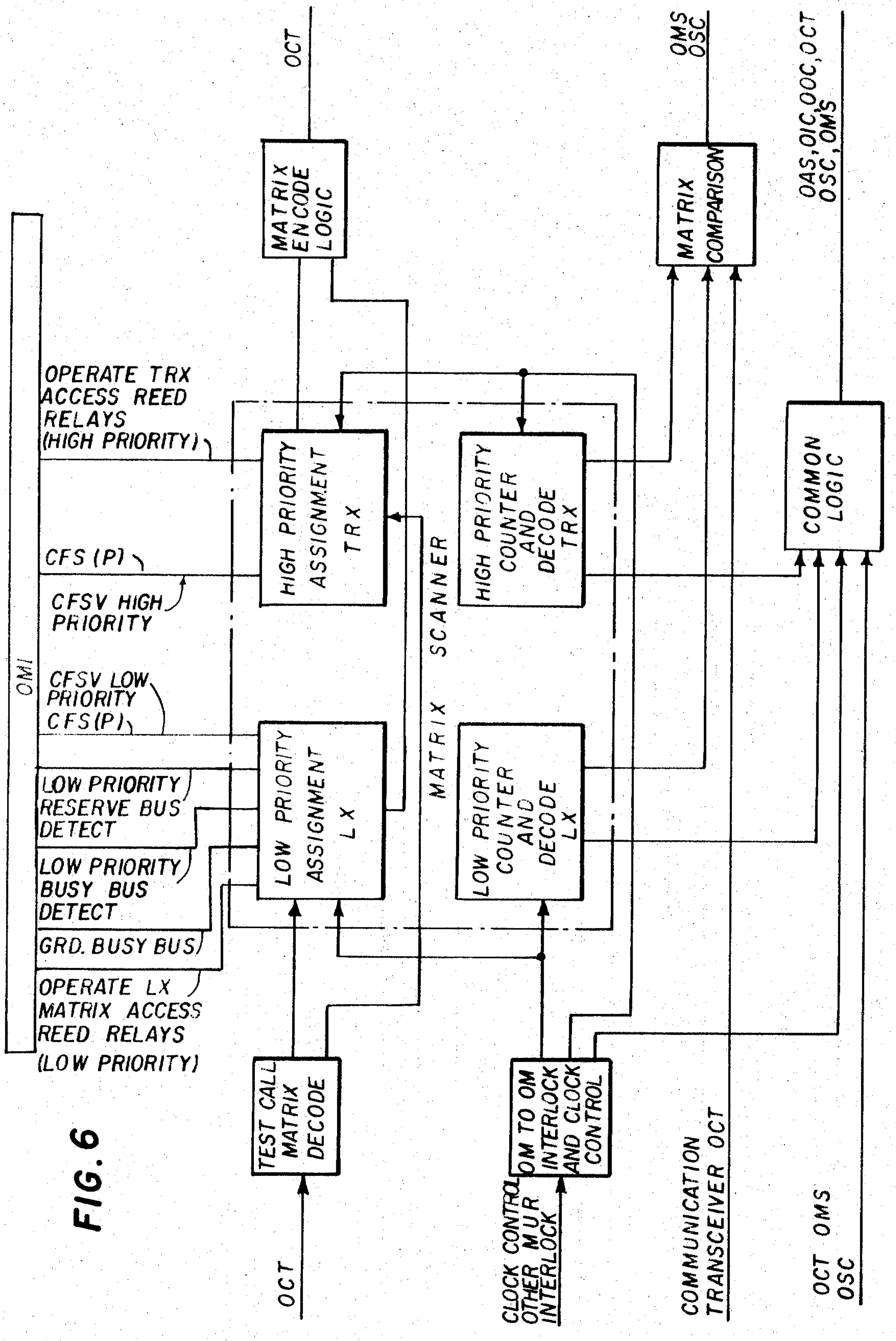

A block diagram of the assigner is shown in FIG. 6 of the drawings. Functionally, the assigner is comprised of a matrix scanner, interlock and clock control, common logic, matrix encode logic, test call matrix decode logic, and matrix comparison logic. The marker's matrix scanner includes lowpriority assignment logic and associated counters with decode logic. This circuitry provides for recognizing line matrix calls-for-service at the C-unit outlet of the line matrix and assigning and connecting the marker to that matrix. The matrix scanner also includes high-priority assignment logic and associated counters with decode logic. This circuitry provides for recognizing trunk-register matrix calls-for-service at the B-unit outlet of the trunk matrix and assigning and connecting the marker to that matrix. The common logic circuit must be properly operated before the access correeds (reed relays) or the busy bus leads can be operated in the connect and access circuitry. It also serves to prepare other circuits of the originating marker 160 to process this call. High priority is given to incoming trunk calls. First, each trunk-register matrix is scanned. Then, line matrix 1 is scanned. Then each trunk-register matrix is scanned again. Then line matrix 2 is scanned. Then each trunk-register matrix is scanned again. Then line matrix 3 is scanned. This cycle continues until all 10 line matrices have been scanned once, and then the cycle is repeated.

In order to properly assign markers as shown in FIG. 6, three circuits are employed as follows:

1. Clocked Interlock Control. This control circuitry insures alternate operation of markers of a marker pair. The interlock control of both markers work together so that both markers cannot simultaneously access the same matrix to serve a call-for-service.
2. Reserve Bus Checks. These checks guard against connecting the originating marker to a matrix previously reserved by a terminating marker. Ground detected on the reserve bus lead by the assigner scanner indicates a terminating marker has assigned to this line matrix. Therefore, this originating marker will not assign itself to this line matrix.
3. Busy Bus Checks. These checks protect against connecting an originating marker to a matrix that has already been assigned to another originating marker. Ground detected on the busy bus lead by the assigner scanner indicates an originating marker has assigned to this line matrix. Therefore, this originating marker will not assign itself to this line matrix. If another terminating marker or originating marker has not assigned to this matrix, ground is placed on the GND BUSY BUS lead to prevent another terminating or originating marker for assigning to this matrix.

Matrix encode logic encodes the line or trunk matrix identity of the assigned matrix and loads it into the communication transceiver (OCT). Test call matrix decode logic decodes communication transceiver commands and messages for test calls. Matrix comparison logic compares test call data to the test call set up in the test matrix. If a test call is to be performed, the data processor unit DPU sends to the originating marker's communication transceiver test call information required for the originating marker to set up the test call. The originating marker then sets up the test call in the test matrix as required by the data processor unit and compares this test call to the test call information in the communication transceiver that was sent over by the data processor unit. This comparison is performed by the matrix comparison logic shown in FIG. 6.

Inlet Control (OIC) Circuit

The main functions of the inlet control circuit (not shown) are scanning, binary-to-decimal decoding, and matrix access and connect selection for identifying a matrix inlet requesting service, and for marking the pull conductor on the inlet side of the network. The inlet control circuit identifies an inlet with a call-for-service by essentially tracing a call-for-service potential from the last matrix stage (C-stage) back to an A-unit inlet with a call-for-service. The inlet control circuit selects and identifies an AB-group, A-unit, and A-unit inlet, and controls the selection of matrix connect equipment for a pull potential to this inlet.

Functionally, the inlet control circuit includes three scanners, associated counters and decode logic, an N+1 binary counter, a call-for-service voltage control, an AB-group scan control, pull battery control and control logic. The three scanners (AB-group, A-unit, and A-unit inlet) are used to trace the call-for-service potential through the matrix from the C-unit inlet to the A-unit inlet in order to identify the party calling for service. The counters and associated decode logic function to operate each scanner. The N+1 binary counter enables and cycles the individual counters. The call-for-service voltage control removes the call-for-service potential as soon as the A-unit inlet calling for service is identified. The AB group scan control is used for determining the type or origination of a call (local line or incoming trunk circuit). Pull battery control, and control logic are used to control matrix connect equipment operation. Comparison circuitry, upcheck and down-check monitor and control circuitry also are provided to check the integrity of data and of connections established or released. Inlet identity (in terms of AB-group, A-unit, and A-unit inlet) is loaded into the communication transceiver shift register, making up part of the data frame.

Outlet Control Circuit (OOC)

Figure 7A:
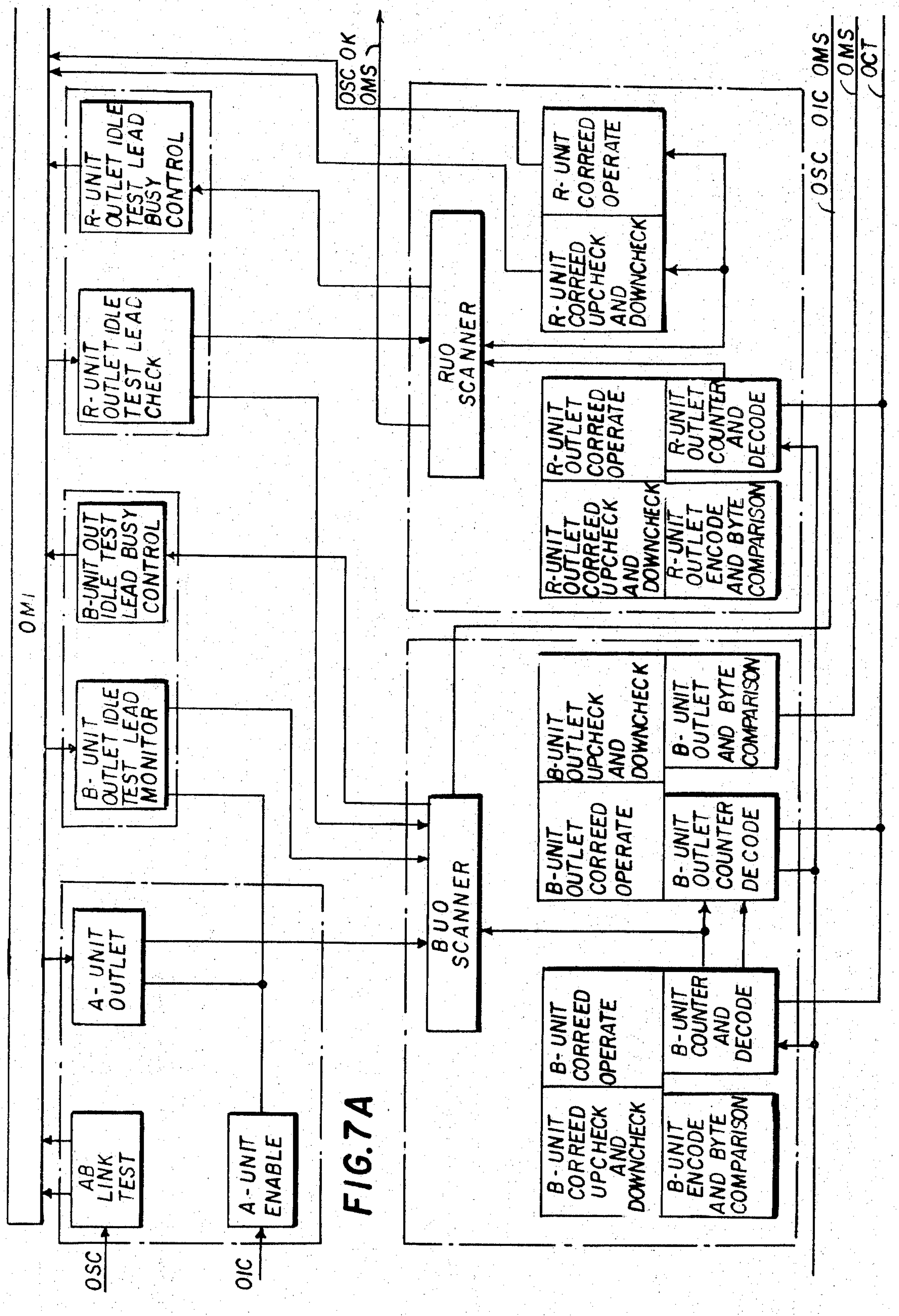
Figure 7B:
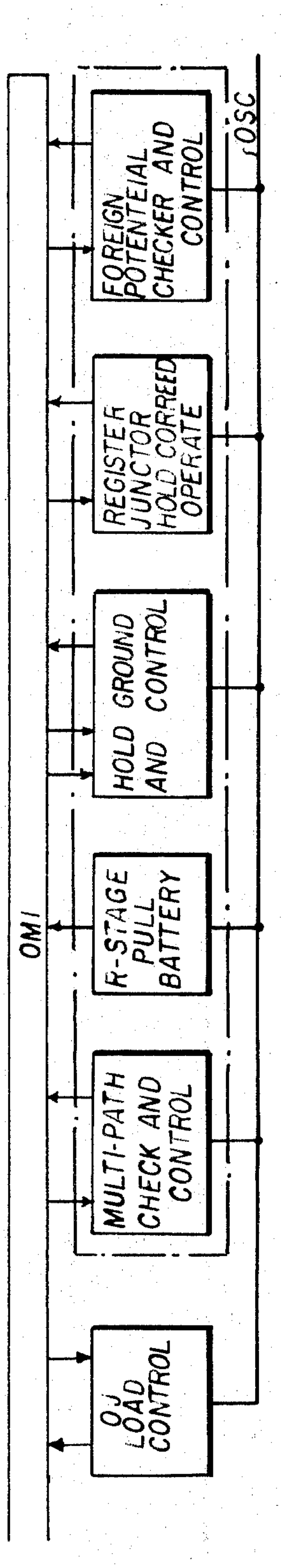
Figure 12:
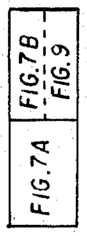

A block diagram of the outlet control circuit is shown in FIG. 7. The outlet control circuit includes:

a. B-unit outlet scanner, including B-unit and B-unit outlet counters and decode logic, and B-unit outlet status decode logic,
b. B-unit and B-unit outlet select, encode, and comparison logic,
c. R-unit outlet scanner, including counter and decode logic, and R-unit status decode logic,
d. R-unit and R-unit outlet select, encode, and comparison logic,
e. A-unit outlet availability decode, AB-link status decode logic,
f. AB-link H-lead control,
g. B-unit and R-unit outlet idle-test (IT) lead busy-out control logic,
h. Originating junctor load control logic,
i. Miscellaneous outlet controls such as hold ground, register junctor, foreign potential and continuity control, R-stage battery pull, and multiple path select and check.

The B-unit outlet scanner includes associated counters (for proper clocking), decode logic (for decoding marker communication transceiver commands from the data processor), encode logic (for sending path data to the marker communication transceiver), and comparison logic (for comparison of actual path data to information in the marker communication transceiver). The B-unit outlet scanner scans the B-unit outlet idle test leads to locate an idle path to an idle originating junctor and/or register junctor which can be used to process a local line or incoming trunk call.

The R-unit outlet scanner includes associated counters, decode logic, encode logic and comparison logic. These sub-circuits perform the same related functions as do the sub-circuits described in the preceding paragraph. The R-unit outlet scanner scans the R-unit idle test leads to locate an idle register junctor. The B-unit, B-unit outlet, and R-unit outlet data that is obtained by the B-unit outlet and R-unit outlet scanners is sent to the marker communication transceiver. The outlet control circuit also controls the pulling and holding of the selected matrix path. In addition to the preceding functions, the outlet control circuit performs a series of tests during establishment of matrix paths to verify that the selected matrix path is a single path (multiple path check), has continuity (tip and ring continuity check), and no foreign potential is present (foreign potential check).

Communication Transceiver (OCT)

Figure 8:
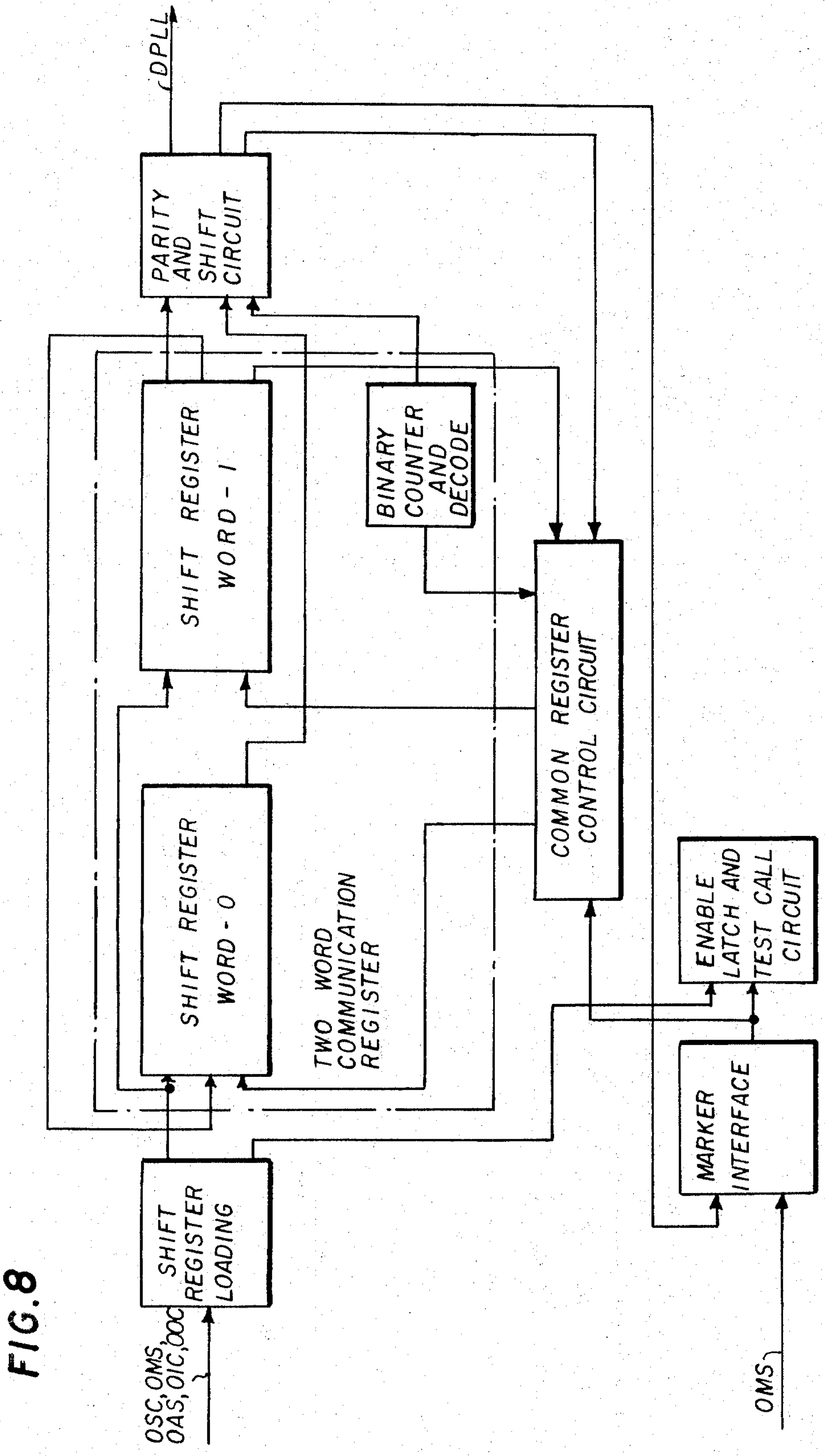

Referring now to FIG. 8, the communication transceiver accepts data from the assigner, inlet control, and outlet control circuits as to the identity of the matrix accessed, inlet served, outlet path and junctors to be used to process a call. It forwards this data to the data processor unit, via the computer communication register. For maintenance purposes, the communication transceiver provides the data processor unit with marker status information for analysis of fault conditions; it also is used to instruct the marker to change status (on-line to off-line, etc.), and to process test calls for the purpose of error and fault separation.

The communication transceiver is comprised of a two-word communication register to provide a serial data link between the originating marker and the computer's communication register (CCR) located in the data processor unit, coding control, and decode logic. The communication register operates independently (not under control of sequence control circuit) and contains its own timing and control logic. The two shift registers make up the majority of the communication transceiver circuitry. Two 26-bit shift registers convert incoming serial data into parallel data and convert parallel data into outgoing serial data. As shown in FIG. 8, the shift register loading circuit, loads the outgoing serial data in the form of a message into the shift register. During call processing, the frame of information transmitted from the marker to the computer's communication register contains the following data message:

a. control data and marker identity,
b. line number identity (local line origination) or trunk number identity (incoming trunk origination),
c. matrix identity of originating junctor (line origination only), and
d. matrix identity of register junctor.

Figure 9:
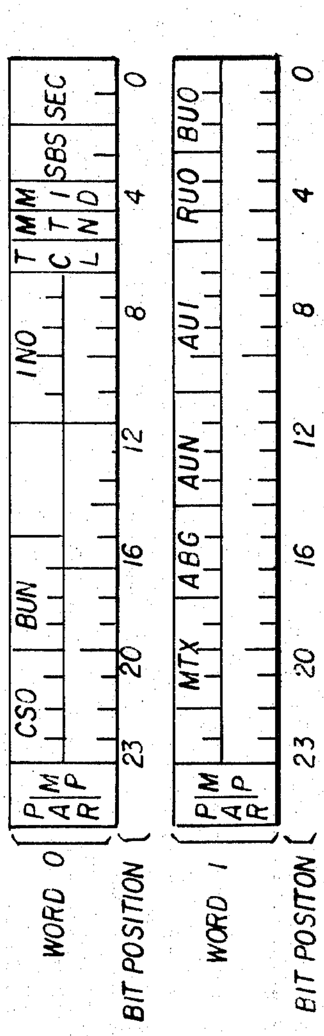

The message is illustrated in FIG. 9 and the abbreviated designations for the message are explained in the following table:

TABLE 1. ORIGINATING MARKER COMMUNICATION CODES

| TYPE OF CODE | CODE MNEMONIC | DEFINITION OF CODE MNEMONIC |
|---|---|---|
| Codes common to both normal call processing and maintenance | SEC | Section (office section) |
| | SBS | Subsection (subsection of marker) |
| | MID | Marker identity |
| | MTN | Maintenance |
| | TCL | Test call |
| Normal call processing codes | INO | Instructions originating (form of test call) |
| | BUN | B unit |
| | CSO | Call status originating |
| | BUO | B unit outlet and R unit |
| | RUO | R unit outlet |
| | AUI | A unit outlet |
| | AUN | A unit |
| | ABG | AB group |
| | MTX | Matrix |
| Maintenance codes | INO | Instruction originating |
| | DGO | Data group originating |
| | TXO | Test matrix originating |
| | MDO | Maintenance data originating |
| | PAR | Parity |
| | MP | Memory protect |

The data that is shifted out of the shift register to the data processor is reloaded back into the shift register. Therefore, after the data is sent to the data processor, the data still appears in the shift register. The communication register control circuit accepts the incoming serial data, initializes counters and latches, generates the necessary commands pertaining to the status of the shift registers, and distributes the information. The binary counter and decode circuit counts each bit as it comes into the shift register. The parity and shift circuit receives and sends serial commands over status leads, and checks for correct data. Each 26-bit incoming serial data word is checked for correct (odd) parity, and correct parity is generated for each outgoing serial 26-bit data word. A shift detector determines if the shift register is accepting data properly.

The interface circuit provides for communication between the computer'communication register and that of the marker. The enable latch and test call circuit decodes test call information from the data processor's communication register and ends it to the other subcircuits of this marker.

Communication Links

As shown in FIG. 5, the originating marker 160 has three types of communication links to the computer complex:

a. Serial transmission via marker's communication transceiver;

b. Sense lines to the computer communication register; and, c. Control pulse directive (CPD) bus from the computer communication register.

The communication between the marker and the computer complex is normally a serial one-way transmission from the marker's communication transceiver to the computer's communication register. This communication contains the identity of the matrix accessed, inlet served, and junctors to be served with the call. For equipment routining, marker routining, diagnostics, etc., serial one-way communication is from the computer communication register to the marker, via the marker's communication transceiver. Sense lines are used to inform the computer of the marker's status. Some examples of instructions sent over the sense lines to the computer communication register follow:

a. Standby. This instruction informs the computer that the marker is in a standby state.

b. Malfunction. This instruction informs the computer of any trouble encountered in marker operations.

c. Idle. This instruction informs the computer that the marker is in an idle condition.

d. On-line. This instruction informs the computer that it has control over the marker.

e. Off-line. This instruction informs the computer that marker is off-line and not in a call processing state.

The control pulse directive (CPD) bus is used to send directives from the computer to the marker. Some typical directives sent from the computer to the marker follow:

a. Standby. Upon receiving this instruction, and as soon as the marker returns to the idle state, it will go into standby status. In this condition, a matrix call-for-service will not be assigned.

b. Report blockage. Upon receiving this instruction, the marker will report the condition of busy links, busy paths, and busy register junctors whenever they are encountered.

c. Initiate send. When the marker goes into a trouble condition, it sends the data in its shift registers to the computer.

Maintenance and Supervisory Circuit (OMS)

The maintenace and supervisory circuit provides the alarms and timers for monitoring the operation of the originating marker. It also provides an interface to test and control equipment, and has the ability to retrieve maintenance data. A block diagram of the maintenance and supervisory circuit is shown in FIG. 10. The maintenance and supervisory circuit monitors the operation of the originating marker from the time a matrix assignment is made until the marker completes its cycle of operation. Each sequence state is timed by a function timer, and overall marker cycle time is timed by an overall cycle timer. If a sequence state is not completed within the prescribed time, the maintenance and supervisory circuit reports trouble to the data processor unit via sense lines; the same is true if a failure is detected. A special timer provides for other timing requirements not provided by the overall and function timers; e.g., "wait" times between sequence states when correed operation is involved. Fault storage and malfunction report storage facilities are provided for communicating trouble conditions (sense lines) to the data processor unit. As the marker advances through its sequence states, the maintenance and supervisory circuit monitors and times each sequence state. If a trouble condition develops, the marker is locked in the sequence state in which the trouble occurred, and the maintenance and supervisory circuit reports the trouble condition.

Marker Interface Circuitry (OMI)

As previously stated, the originating marker 160 supervises and controls the operation of the line matrix and trunk matrix portion of the switching network. In order to accomplish this function, marker interface circuits (not shown) are employed. Marker interface circuits convert marker electronic logic signals to voltages capable of driving network correeds, relays and lamps. Conversely, the operation of the marker's logic circuits are controlled by signals derived from the operation of network correeds, relays, or other electro-mechanical components. The interface circuits in the originating marker also provide a means for compatible transfer of information between its electronic logic and electromechanical circuitry in the network. Each mnemonic-designated circuit of the marker contains interface circuits. The group of interface circuits used in the marker constitute the interface between the functional logic circuits of the marker and the electromechanical circuits of the network.

Three frequently used interface circuits are the main battery test (MBT) circuit, main battery ground switch (MGS), and main battery switch (MBS). The purpose of the main battery test circuit is to detect the presence of main battery or any voltage more negative than −8 volts. The main ground switch is used to connect ground to a circuit that is connected to a negative voltage. The output of the main ground switch is connected to electromechanical equipment; the inputs are connected to electronic logic circuits. The main battery switch is used to connect battery to a circuit that is connected to ground. The output of the main battery switch is connected to electromechanical equipment; the inputs are connected to electronic logic circuits.

Test Matrix (OTX)

The test matrix (not shown) is a tool used to aid in marker testing. The test matrix does not process any customer traffic. All calls to the test matrix are initiated by a test call from the data processor unit via the marker communication transceiver. Certain fault conditions can be simulated in the test matrix to verify that the checking hardware in the marker is operating properly. The test matrix can be used to routine or cycle the marker to localize a malfunction, without affecting customer traffic.

For each marker pair, there is a line test matrix (LTX) and a trunk-register test matrix (TTX). Each test matrix has an access circuit almost identical to a switching network matrix, but the connect and switching circuits are entirely different. A partially implemented connect circuit reacts much like a regular connect circuit, but instead of connecting to one of many inlets or outlets, always connects to the same point.

Certain fault conditions can be simulated in the test matrix. By simulating a fault and routining the marker, the operation of the marker checking hardware can be verified without affecting normal call processing. Fault simulation in the test matrix can be done under program control (routines to be performed frequently) or manually (infrequent routines and those which require measurement). Note that this circuit includes circuitry to simulate certain originating and register junctor functions.

Interlock Arrangement

Referring now to FIGS. 1, 3 and 11, there is shown an interlock arrangement, which switches the control from the originating marker 160 to the register junctor, and which is constructed in accordance with the present invention. As shown in FIG. 1, an MBT gate 161 is connected through a Zener diode 162 via the connect and access circuit to the lead H extending between the register junctor and the R matrix for detecting the negative battery supply potential connected to the left hand side of the relay coil 9H of the originating junctor when the relay of the R matrix operates its contact connected in series with its winding which in turn is connected to the H lead, whereby when the R matrix is pulled, the MBT gate 161 is energized in response to the negative battery potential at the relay 9H for generating a true signal TEST JH 1 for indicating to the originating marker 160 that a hold path has been established through the R matrix to the originating junctor 113. A by-pass resistor 163 is connected at one of its ends between the MBT gate 161 and the diode 162 and at its other end to ground to enable sufficient current to pass through the diode 162 and render it conductive, because the gate 161 is of an high-input impedance. An MBT gate 164 has its input connected through the connect and access circuit to the H lead for the purpose of detecting an intermediate potential (between ground and the supply potential), the intermediate potential being a ground potential through a resistance in the register junctor RRJ-O as shown in FIG. 3, whereby when the intermediate potential is connected to lead H the gate 164 is turned on to cause the signal TEST JH 2 to become true and the gate 161 remains turned off to cause the signal TEST JH 1 to remain false as a test indication for the originating marker 160. When both signals TEST JH 1 and TEST JH 2 are false (both gates 161 and 164 are turned off), the originating marker 160 determines that the gates 161 and 164 have detected direct ground reference-potential connected to the lead H by a main ground switch 165, which has its output connected directly to the lead H, and which is energized by a signal GROUND JH as hereinafter described in greater detail. As a result, when both of the MBT gates 161 and 164 are de-energized, such a condition indicates that the ground signal from the main ground switch 165 is connected through to the lead H for supplying the preliminary holding potential for the R matrix and the originating junctor 113. Both of the gates 161 and 164 being energized indicates that the battery potential at the relay coil 9H is connected through the R matrix to the lead H for the register junctor. When the gate 164 is turned on and the gate 161 is turned off, such a condition indicates the presence of the intermediate resistance-ground potential connected to the lead H via the register junctor, and thus the interlock is completed since the register junctor has taken control of the path and the originating marker 160 has released. In the latter case, the diode 162 does not conduct since the intermediate resistance ground potential is insufficient to cause the conduction of the diode 162.

An MBT gate 166 has its input RJXX-HR connected through the connect and access circuit to the lead HR to the register junctor so that when the connect and access circuit connects the originating marker 160 to a selected register junctor, such as the register junctor RRJ-0, the negative battery potential at the relay coil 10H of the register junctor RRJ-0 (FIG. 3) is connected to the input of the MBT gate 166, whereby it turns on to cause its output signal TEST JHR to become true and thus indicate that a connection has been established to the selected register junctor. A main ground switch 167 connects ground potential through a Zener diode 168 and the connect and access circuit to the lead HR in parallel with the MBT gate 166 to supply a resistance ground potential (a potential intermediate between ground potential and the negative supply potential) to the relay coil 10H of the register junctor via the lead HR, whereby the relay 10H operates its contacts to, among other things, connect ground potential through a resistance to the lead H for holding the connection through the R matrix to the relay coil 9H of the originating junctor 113. The diode 168 is used as a voltage dropping device to insure that the gate 166 remains energized in parallel with the relay 10H and thus is unaffected by the operation of the switch 167, since the diode 168 maintains a negative potential at the input to the gate 166 so that subsequently thereto when the lead TEST JHR is checked by the originating marker 160, if the gate 166 is turned off, the originating marker 160 can determine that a direct ground potential is now connected to the lead HR by a main ground switch 1001 of the register junctor RRJ-0 of FIG. 3 and not that the ground from the main ground switch 167 has de-energized it. As a result, the MBT gate 166 serves the dual purpose of determining that a connection has been established to the register junctor RRJ-0 and that the interlock has been completed when the register junctor has supplied a holding potential for the relay 10H. Main ground switch 1001 of the register-junctor RRJ-0 (FIG. 3) is energized in response to the message from the transceiver (FIG. 5) causing the unit DPU to store seizure information in the memory register of the selected register junctor and to the relay A (FIG. 3) being energized by the continuity and foreign potential detector (FIG. 1), by connecting a short circuit across leads RO and TO, once the relay 10H has connected the leads RO and TO across the windings of the relay A, whereby the relay A closes its contacts for supplying a ground potential to the input to a CTG gate 1010 and thus to energize the pulse highway PHM for the common logic unit. The switch 1001 is energized only after the register-sender subsystem receives the message from the communication transceiver OCT indicating which register junctor is about to be seized. In this regard, after the transceiver sends its message to the data processor unit DPU, the unit stores the message and translates the register junctor equipment location identity so that the unit DPU can store a bit of information in the register of the selected register junctor.

The dial-pulse repeating relay A of the register junctor is operated initially by the continuity and foreign potential detector for two very important reasons. Firstly, such operation insures that a path is established to the relay A and that it is operative (a malfunctioning A relay could otherwise cause the call to be abandoned erroneously). Secondly, during dial pulsing from an incoming trunk, there may not be sufficient time to receive the first dial pulse, and thus by causing the relay to operate, the first incoming pulse need not be detected.

Referring now to FIG. 11, there is shown the logic circuits for responding to and energizing the respective main ground switches and MBT gates of the originating marker 160 shown in FIG. 1 of the drawings. A coincidence AND gate 1101 is energized by the signals TEST JH 1 and TEST JH 2 from the respective gates 161 and 164 of FIG. 1 to generate a signal SET UA RESET UP1 and an OR gate 1103 for in turn generating a signal SET UA1, whereby the signals SET UA RESET UP1 and SET UA1 advance the sequence state control circuit of FIG. 5 to its next state 201. Thus, when both of the gates 161 and 164 are energized to indicate that a path has been established to the negative battery potential via the relay coil 9H of the originating junctor 113 (FIG. 1) for holding purposes, the gate 1101 is energized during the sequence state 200 of the sequence state control circuit of FIG. 5 and when a special timer 1105 generates a signal 512 μS SPECIAL TIME which is started by the output of a coincidence AND gate 1107 having its output connected to the timer 1105 and being energized by the signal SS 200 indicative of the state of the sequence circuit and by the signal TEST JHR from the gate 166 of FIG. 1. In this regard, when the gate 166 is energized to indicate that a connection is established to the negative potential at the relay 10H, the timer 1105 is started, and thus the timer 1105 is not started unless and until the connect and access circuit establishes a connection from the input of the gate 166 to the lead HR for the relay 10H of the register junctor to serve as a verification thereof. The timer 1105 provides a time delay interval of 512 microseconds to permit the contacts of the relays in the switching networks to complete their operations before the leads TEST JH 1 and TEST JH 2 are tested. A coincidence AND gate 1109 is energized in response to both of the signals TEST JH 1 and TEST JH 2 being false during the sequence state 209 to generate a signal SET UB RESET and to energize an OR gate 1111 for generating a signal SET UB1 FF, the latter two signals causing the sequence state control circuit of FIG. 5 to be advanced to its next sequence state, thereby verifying that both of the gates 161 and 164 have been de-energized and thus that direct ground potential has been applied to the lead H by the main ground switch 165 of FIG. 1. A coincidence AND gate 1114 generates a signal SET UA RESET UP2 and energizes an OR gate 1115 to generate a signal SET UA1 FF to advance the sequence circuit. The gate 1114 is energized by the signal TEST JH 2 being true during the sequence state 300 when a timer 1116 generates a signal 128 μS SPECIAL TIMER after a predetermined time interval of 128 microseconds commencing when the timer 1116 is energized by a coincidence AND gate 1118 in response to the signal TEST JH 1 being false during the sequence state 300. As a result, when resistance ground potential is connected to the lead H by the register junctor, the MBT gate 161 remains de-energized to activate the gate 1118 and thus to start the timer 1116, thereby indicating that a resistance ground potential has been connected to the lead H and the negative supply battery potential at the relay coil 9H is no longer present at the lead H. The delay interval generated by the timer 1116 provides sufficient time for the electronic gate 164 to become energized. The energization of the gate 1114 indicates that the gate 164 is energized and that the gate 161 is turned off so that the sequence state control circuit of FIG. 5 may be advanced accordingly. A signal A UNIT INLET CFS FOUND is connected to an inhibit input of the gate 1114 for maintenance purposes and is energized when an inlet calling for service is not marked busy. A coincidence AND gate 1122 is energized by the signal TEST JHR from the MBT gate 166 of FIG. 1 during the sequence state 214 for generating a signal SET UP UA and for energizing an OR gate 1124 to generate a signal SET UP FF for advancing the sequence state control circuit to its next state, whereby an indication is provided that the gate 166 is de-energized as a result of a direct ground applied to the lead HR by the main ground switch 1001 of the register junctor (FIG. 3). The signal TEST JHR and a signal REG SENDER HR HOLD generated by an inverter gate 1126 are utilized by the marker 160 for maintenance and diagnostic purposes.

A latch APPLY is set by the signal SS 209 from the sequence state control circuit of FIG. 5 during its sequence state 209 for energizing a coincidence AND gate 1128, which in turn generates the signal GROUND JH for energizing the main ground switch 165 of FIG. 1. A signal MALF is connected to an inhibit input to the gate 1128 for maintenance purposes and inhibits the gate 1128 in the case of a malfunction. An OR gate 1131 resets the latch APPLY during the sequence state 300 or by a reset signal or maintenance purposes. A latch OPERATE RJ-H CRRD is set during the sequence state 212 for the purpose of energizing an coincidence AND gate 1133, which in turn generates the signal GROUND JHR via a cable link circuit 1135 for energizing the main ground switch 167 of FIG. 1. The signal MALF also, when true, energizes an inhibit input into the gate 1133 for maintenance purposes. An OR gate 137 resets the latch OPERATE RJ-H CRRD in response to the sequence state 300 or the signal RESET for maintenance purposes.

Operation of Interlock Arrangement

Considering now a typical operation of the interlock arrangement of the present invention, assuming that a calling line has initiated a call and the line identity and the identity of the first idle register junctor is determined by the originating marker 160, a message is sent from the two word communication register of the communication transceiver OCT of FIG. 8 to the data processor unit DPU during sequence states 112 and 113 of the sequence state control circuit of FIG. 5 so that the data processor unit DPU can translate the information contained in the message and in turn cause the common logic unit of the register-sender subsystem to be informed as to which register junctor is about to be seized, whereby the call processing information from the calling line can be transmitted to the common logic unit. Thereafter, an originating path is established through the A matrix 111, the B matrix 112 and the R matrix 114 under the control of the originating marker 160 which via the connect and access circuit connects negative supply battery potential to the windings of the selected relay coils in the A matrix and in the R matrix through their diodes associated therewith, and connects a ground potential to the lead extending between the selected relay coil of the B matrix and the selected relay coil of the R matrix. As shown in FIGS. 1 and 11, when the relay in the R matrix operates, it closes a switch to connect the negative battery potential through the lower winding of the delay coil 9H and the right-hand winding of the R matrix relay to the lead H, and in so doing, the gates 161 and 164 of the originating marker 160 detect the presence of the negative battery potential and thus indicate that the holding control path is established. As a result, the negative battery potential causes the Zener diode 162 to conduct and thus the gate 161 is energized, the gate 164 also being energized since it is connected directly to the lead H. The gate 166 of the originating marker 160 is connected by the connect and access circuit to the lead HR of the selected register junctor, and thus the gate 166 is energized by the negative potential at the relay 10H of the register junctor of FIG. 3 via the relay coil 10H and the lead HR. As a result, as shown in FIG. 11, the gate 1107 is energized by the output of the gate 166 generating the signal TEST JHR during the sequence state 200 to start the timer 1105. At the end of the timing interval of the timer 1105, the gate 1101 is energized by the gates 161 and 164 being turned on by the battery potential associated with the relay coil 9H. The gate 1101 energizes a pair of signals for advancing the sequence state control circuit of FIG. 5 to its next sequence state to indicate that the holding path has been established and that the register junctor is connected via its HR lead to the originating marker 160. If the gate 1101 is not energized at this time, circuitry (not shown) is energized in response thereto to initiate diagnostic or other maintenance functions automatically.

After the originating marker performs some other function, the sequence circuit advances to its state 209, and generates a signal SS 209 to set the latch APPLY of FIG. 11, which in turn enables the gate 1128. The output signal GROUND JH of the gate 1128 energizes the switch 165 of FIG. 1 to apply a direct ground potential to the lead H in parallel with the gates 161 and 164, which turn off due to the ground potential. The ground potential applied by the switch 165 serves to hold operated the relay 9H of the originating junctor 113 and the selected relay of the R matrix. The relay 9H in turn applies a holding ground to the series-connected selected relays of the A and B matrices in series with the relay COA of the line circuit of the calling line.

In the sequence state 209, the ground potential applied to the lead H via the main round switch 165 causes the gates 161 and 164 to be turned off and thus the signals TEST JH 1 and TEST JH 2 become false, whereby the gate 1109 of FIG. 11 is enabled to determine that the ground is present on the lead H for holding purposes. As a result, the signals SET UB RESET and SET UB1 FF are generated to advance the sequence state control circuit of FIG. 5 to its next state. When the sequence state control circuit of FIG. 5 advances thereafter to its state 212, the signal SS 212 sets the latch OPERATE RJ-H CRRD for energizing the gate 1133, which in turn generates the signal GROUND JHR via the cable link 1135. As a result, in order to seize the selected register junctor, the signal GROUND JHR energizes the main ground switch 167 of FIG. 1 to connect ground through the diode 168 to the lead HR of the register junctor, whereby the relay 10H operates to connect the tip and ring leads RO and TO to the dial-pulse repeating relay A of the register junctor. The continuity and foreign potential director of the originating marker 160 applies a short-circuit across the leads RO and TO for operating the relay A. The relay A operates and closes its contacts 10A to cause a true signal to be generated on the pulse highway lead PHM for the common control logic indicating that seizure has taken place. The relay 10H also connects ground through a resistance to the lead H in parallel with the ground already connected via the main ground switch 165 for holding purposes, and as a result of the intermediate resistance ground potential applied via the contacts of the relay 10H to the lead H, the gate 164 is turned on but the gate 161 remains off. Subsequently thereto, the register sender in response to the message received from the two word communication register of FIG. 8 via the data processor unit DPU and in response to the signal on the pulse highway PHM, energizes the lead HRJM of the register junctor to cause the main ground switch 1001 to apply ground potential to the lead HR for holding the relay 10H operated, whereby the gate 166 is de-energized to cause the signal TEST JHR to become false.

When the sequence state control circuit of FIG. 5 is advanced subsequently to its state 300, the gate 1137 is energized to reset the latch OPERATE RJ-H CRRD, and similarly the gate 1131 is energized to reset the latch APPLY, whereby the gates 1128 and 1133 are de-energized and thus the signals GROUND JH AND GROUND JHR become false. Thus, the main ground switches 165 and 167 of FIG. 1 are de-energized to cause their ground signals to be removed from the lead H and the lead HR via the diode 168, respectively. As a result of the resistance ground from the register junctor connected to the lead H, the gate 161 remains turned off and its output signal TEST JH 1 is false, and the signal TEST JH 2 is true, whereby the gate 1118 is enabled to start the timer 1116. After its timing interval, the timer 1116 generates the signal 128 μS SPECIAL TIMER to enable the gate 1114 since the signal TEST JH 2 is now true. Thus, the gate 1114 causes the signals SET UA REST UP2 and SET UA1 FF (via the gate 1115) to advance the sequence state control circuit to its next state and thus to return it eventually to its final state, whereby the marker 160 receives an indication that the register junctor has taken control and that the marker may now relinquish its control of the originating path.

What is claimed is:

1. In a communication switching system having a switching network for interconnecting calling and called lines and having marker means for controlling and switching network to establish a path including holding control means between said lines and a plurality of register junctors, an interlock arrangement comprising: means for applying a reference potential to said holding control means to maintain temporarily said path established between said network and a preselected one of said register junctors; detecting means responsive to said reference potential for seizing said preselected register junctor to cause it to apply a second potential to said holding control means; means for detecting a holding signal from said register junctor indicating that it is now ready to assume control of the switching network; and said detecting means responsive to said second potential for removing said reference potential from said holding means.

2. An interlock arrangement according to claim 1, wherein said detecting means further detects a supply potential of the system being connected via the switching network to the holding control means for indicating that said temporarily established path is completed.

3. An interlock arrangement according to claim 2, wherein said means for detecting a holding signal supplies an intermediate potential to the register junctor for indicating that said reference potential was connected by the marker to the holding control means.

4. An interlock arrangement according to claim 3, wherein said register junctor responds to said intermediate potential and connects said second potential to the holding control means in parallel with said reference potential, said second potential being intermediate said reference potential and said supply potential.

5. An interlock arrangement according to claim 4, said holding signal comprises a reference potential supplied to said means for detecting a holding signal.

6. An interlock arrangement according to claim 7, wherein said detecting means includes a voltage dropping device.

7. An interlock arrangement according to claim 6, wherein said voltage dropping device comprises a Zener diode.

8. An interlock arrangement according to claim 4, wherein said register junctor includes a pulse-repeating relay, said marker means includes means for operating said relay upon seizure by said marker means, said marker means including a transceiver for sending a message to cause said register junctor to generate said hold signal in response to said message and in response to the operation of said relay.

9. An interlock arrangement according to claim 8, wherein said holding signal comprises a reference potential supplied to said means for detecting a holding signal.

10. An interlock arrangement according to claim 1, wherein said register junctor includes a pulse-repeating relay, said marker means includes means for operating said relay upon seizure by said marker means, said marker means including a transceiver for sending a message to cause said register junctor to generate said hold signal in response to said message and in response to the operation of said relay.

* * * * *